(12) United States Patent
Hirosue et al.

(10) Patent No.: US 7,408,612 B2
(45) Date of Patent: Aug. 5, 2008

(54) DISPLAY DEVICE WITH SIGNAL LINE AND SCAN LINE INTERSECTION OUTSIDE OF DISPLAY REGION

(75) Inventors: Miyuki Hirosue, Kikuchi-gun (JP); Akio Nakayama, Kikuchi-gun (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 11/181,979

(22) Filed: Jul. 15, 2005

(65) Prior Publication Data

US 2005/0248710 A1 Nov. 10, 2005

Related U.S. Application Data

(62) Division of application No. 10/403,086, filed on Apr. 1, 2003, now Pat. No. 7,002,657.

(30) Foreign Application Priority Data

Apr. 4, 2002 (JP) ............... 2002-102051

(51) Int. Cl.
*G02F 1/1345* (2006.01)
(52) U.S. Cl. .............. 349/151; 349/149; 349/152
(58) Field of Classification Search .......... 349/149–152
See application file for complete search history.

(56) References Cited

U.S. PATENT DOCUMENTS

| | | | |
|---|---|---|---|
| 5,488,498 A | | 1/1996 | Fujii et al. |
| 5,742,074 A * | | 4/1998 | Takizawa et al. ............ 257/59 |
| 6,172,732 B1 * | | 1/2001 | Hayakawa et al. .......... 349/152 |
| 6,407,795 B1 * | | 6/2002 | Kamizono et al. .......... 349/149 |
| 6,493,056 B2 | | 12/2002 | Bjorkengren et al. |
| 6,583,845 B1 * | | 6/2003 | Chung et al. ................ 349/150 |
| 6,661,490 B2 * | | 12/2003 | Tanaka ........................ 349/139 |
| 6,664,942 B1 | | 12/2003 | Kim et al. |
| 6,724,456 B2 | | 4/2004 | Kamiya |
| 7,050,135 B2 * | | 5/2006 | Kim ............................ 349/139 |
| 2002/0044251 A1 | | 4/2002 | Togashi et al. |
| 2002/0109814 A1 | | 8/2002 | Murahashi et al. |
| 2002/0145697 A1 * | | 10/2002 | Hoshina ...................... 349/151 |

FOREIGN PATENT DOCUMENTS

| | | |
|---|---|---|
| JP | 6-11721 | 1/1994 |
| JP | 9-311341 | 12/1997 |
| JP | 2000-47209 | 2/2000 |
| JP | 2000-81636 | 3/2000 |
| JP | 2000-155307 | 6/2000 |
| JP | 2002-350892 | 12/2002 |
| KR | 100139374 B1 | 3/1998 |

* cited by examiner

*Primary Examiner*—Michael H Caley
(74) *Attorney, Agent, or Firm*—Oblon, Spivak, McClelland, Maier & Neustadt, P.C.

(57) ABSTRACT

A display device comprises scan lines on a insulating substrate, signal lines intersecting with the scan lines with an insulating film interposed therebetween, a display area comprising pixel electrodes connected to the signal lines, a scan line driver circuit connected to the scan lines, a signal line driver circuit connected to the signal lines. The scan line driver circuit and the signal line driver circuit are mounted directly on the insulating substrate outside of the display area and close to one side of the display area. Lines connecting the scan line driver circuit and the signal line driver circuit are formed in an area in which the scan line driver circuit and the signal line driver circuit are mounted.

2 Claims, 6 Drawing Sheets

DISPLAY DEVICE WITH SIGNAL LINE AND SCAN LINE INTERSECTION OUTSIDE OF DISPLAY REGION

CROSS-REFERENCES TO RELATED APPLICATIONS

This application is a divisional of and claims the benefit of priority from U.S. patent application Ser. No. 10/403,086 filed on Apr. 1, 2003, now U.S. Pat. No. 7,002,657, issued Feb. 21, 2006, which claims the benefit of priority from Japanese Patent Application No. 2002-102051, filed on Apr. 4, 2002.

BACKGROUND OF THE INVENTION

1. Field of the Invention

The present invention relates to a display device which is driven by driver circuits and more particularly to a preferred display device that is applied to a liquid crystal display device.

2. Related Background Art

Display devices which are employed in conventional liquid crystal display monitor devices or notebook computers and the like require a display pixel count of 480×640 even for a small VGA (Video Graphic Array) mode display device, and require drive signal lines pertaining to several hundred levels. Where active matrix drive-type display devices are concerned, a plurality of respective driver circuits is needed to drive the sources or gates of the thin film transistors. Accordingly, the driver circuits or TCPs (Tape Carrier Packages) which afford a connection to the driver circuits are disposed on extending lines on the same side of the drive signal lines within the display region.

In small and medium display devices such as those in cellular telephones, PDAs (Personal Digital Assistants) and the like which have achieved rapid growth in recent years as application fields for liquid crystal display devices, there are cases of there being one driver circuit for the drive of the source lines and gate lines due to the relatively small display pixel count. However, in this case, with methods that involve the placement of TCPs or driver circuits on extending lines of the drive signal lines of the display region as per the prior art, there have been problems such as the great complications involved in implementing the miniaturization of the display device. In cases where there is a concentration of the driver circuits, and the flexible substrates that supply a potential from outside the liquid crystal panels to these driver circuits, and so forth, in the vicinity of one side of the display region, and, at the same time, the side periphery region whereon these driver circuits and flexible substrates and so forth are mounted which excludes the display region is reduced, the layout of the wiring from the driver circuits to the display region, the placement of transfer electrodes that supply a potential to the opposing electrodes of the opposing substrate and of cutting or overlap marks, and the placement of the input/output terminals of the driver circuits and the wiring that is connected to these terminals, and so forth, is problematic. There has also been the problem of the wiring resistance required for the display characteristics not being satisfied or the manufacturing yield being reduced.

SUMMARY OF THE INVENTION

In view of the foregoing problems, it is an object of the present invention to provide a display device that makes miniaturization possible without there being a reduction in the display characteristics and the manufacturing yield.

The first display device according to the present invention is a display device having scan lines on a insulating substrate; signal lines intersecting with the scan lines with an insulating film interposed therebetween; a display area comprising pixel electrodes connected to the signal lines; a scan line driver circuit connected to the scan lines; a signal line driver circuit connected to the signal lines, wherein the scan line driver circuit and the signal line driver circuit are mounted directly on the insulating substrate outside of the display area and close to one side of the display area, and lines connecting the scan line driver circuit and the signal line driver circuit are formed in an area in which the scan line driver circuit and the signal line driver circuit are mounted.

The second display device according to the present invention is a display device according to the first display device, wherein at least a part of lines connecting the scan line driver circuit and the scan lines in the display area is formed in an area in which the signal line driver circuit is mounted.

The third display device according to the present invention is a display device according to the first display device, wherein at least a part of lines connecting the signal line driver circuit and the signal lines in the display is formed in an area in which the scan line driver circuit is mounted.

The fourth display device according to the present invention is a display device according to the first display device, wherein lines connecting the scan line driver circuit and the scan lines intersect with lines connecting the signal line driver circuit and the signal lines in the display area with a insulating film interposed therebetween.

The fifth display device according to the present invention is a display device according to the first display device, wherein a ratio of a line width to a space between lines is a predetermined value in substantially all area in which lines connecting the scan line driver circuit and the scan lines in the display area are formed.

The sixth display device according to the present invention is a display device according to the first display device, wherein a ratio of a line width to a line interval is a predetermined value in substantially all area in which lines connecting the signal line driver circuit and the signal lines in the display area are formed.

The seventh display device according to the present invention is a display device having scan lines on a insulating substrate; signal lines intersecting with the scan lines with a insulating film interposed therebetween; a display area comprising pixel electrodes connected to the signal lines; a scan line driver circuit connected to the scan lines; a signal line driver circuit connected to the signal lines; an opposing substrate opposite to the insulating substrate, wherein the scan line driver circuit and the signal line driver circuit are mounted directly on the insulating substrate outside of the display area and close to one side of the display area, and a transfer electrode on the insulating substrate for supplying a potential to an opposite electrode on the opposing substrate is formed close to a side opposite to the one side of the display area to which the scan line driver circuit and the signal line driver circuit are mounted close.

The eighth display device according to the present invention is a display device according to the seventh display device, wherein lines connecting the scan line driver circuit and the signal line driver circuit are formed in an area in which the scan line driver circuit and the signal line driver circuit are mounted.

The ninth display device according to the present invention is a display device having scan lines on a insulating substrate;

signal lines intersecting with the scan lines with a insulating film interposed therebetween; a display area comprising pixel electrodes connected to the signal lines; a scan line driver circuit connected to the scan lines; a signal line driver circuit connected to the signal lines; a flexible substrate providing a scan potential to the scan line circuit and a signal potential to the signal line circuit from outside, wherein the scan line driver circuit and the signal line driver circuit are mounted directly on the insulating substrate outside of the display area and close to one side of the display area, and a common alignment mark is formed for mounting the scan line driver circuit and the signal line driver circuit on the insulating substrate and mounting the flexible substrate on the insulating substrate.

The tenth display device according to the present invention is a display device having scan lines on a insulating substrate; signal lines intersecting with the scan lines with a insulating film interposed therebetween; a display area comprising pixel electrodes connected to the signal lines; a scan line driver circuit connected to the scan lines; a signal line driver circuit connected to the signal lines; a flexible substrate providing a scan potential to the scan line circuit and a signal potential to the signal line circuit from outside, wherein the scan line driver circuit and the signal line driver circuit are mounted directly on the insulating substrate outside of the display area and close to one side of the display area, and terminals on the insulating substrate connecting the flexible substrate and the scan line driver circuit or the signal line driver circuit, and lines connecting terminals of the flexible substrate and the scan line driver circuit or the signal line driver circuit, are formed wider with the longer lines.

The eleventh display device according to the present invention is a display device having a display area comprising a plurality of pixels; scan lines on a insulating substrate; signal lines intersecting with the scan lines with a insulating film interposed therebetween; pixel electrodes connected to the signal lines; a scan line driver circuit connected to the scan lines; a signal line driver circuit connected to the signal lines; a flexible substrate providing a potential scan to the scan line circuit and a potential signal to the signal line circuit from outside, wherein the scan line driver circuit and the signal line driver circuit are mounted directly on the insulating substrate outside of the display area and close to one side of the display area, and a dummy terminal, which is not connected to the scan line driver circuit nor the signal line driver circuit, is formed between or at the outermost side of terminals on the insulating substrate connecting the flexible substrate and the scan line driver circuit or the signal line driver circuit.

The twelfth display device according to the present invention is a display device having an opposing substrate opposite to a insulating substrate with liquid crystals interposed therebetween; a plurality of liquid crystal panels formed in the opposing substrate and the insulating substrate, wherein an alignment mark or a mark for confirmation after alignment is formed on the opposing substrate for cutting a liquid crystal panel off the opposing substrate and the insulating substrate.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
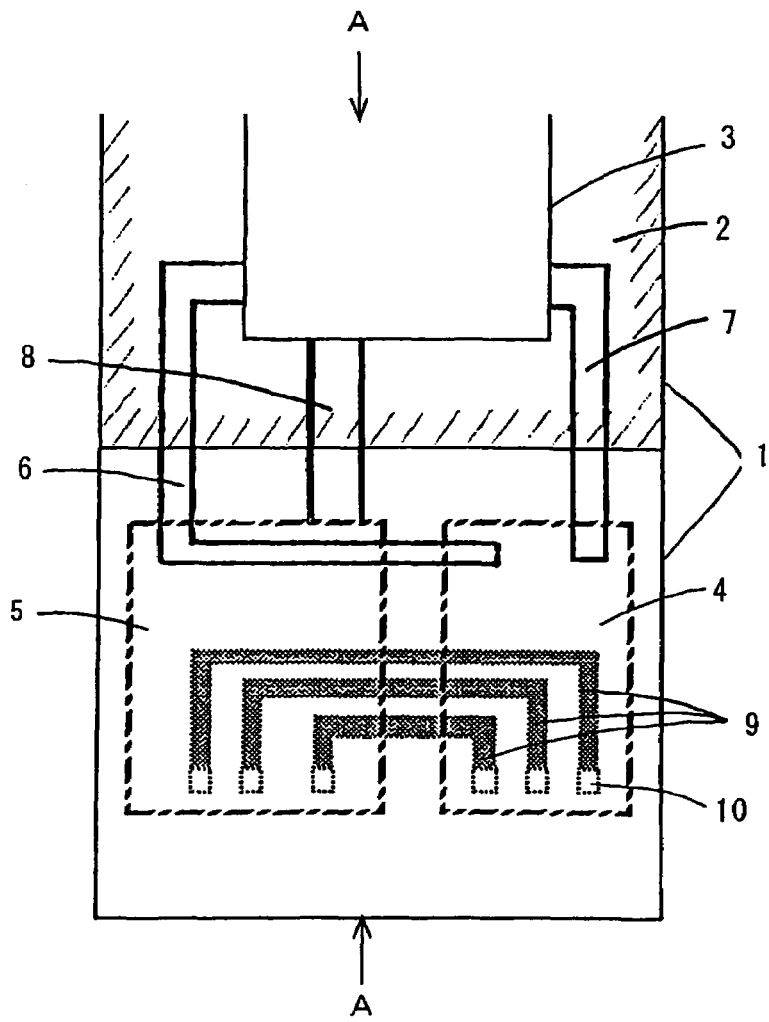
FIG. 1 is a plan view of a liquid crystal display device according to the first embodiment of the present invention.

A first embodiment of the present invention will be described by means of FIGS. 1 and 2. FIG. 1 is a planar view of the liquid crystal display device according to the first embodiment of the present invention, and FIG. 2 is a cross-section along the line A-A in FIG. 1.

Figure 2:
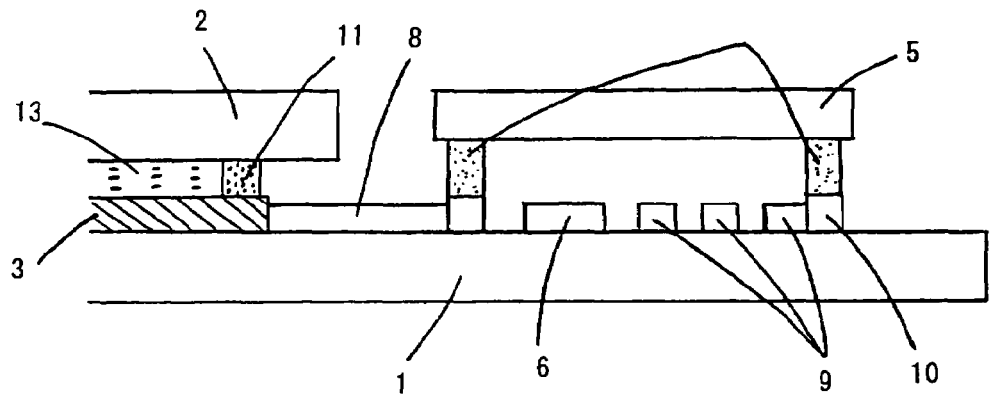
FIG. 2 is a cross-sectional view along line A-A in FIG. 1.

In FIGS. 1 and 2, 1 denotes an insulating substrate constituted by a glass substrate, for example; 2 denotes an opposing substrate; 3 denotes a display region that comprises pixel electrodes, and so forth; 4 denotes a scan line driver circuit; 5 denotes a signal line driver circuit; 6 denotes a group of lines that connects scan lines on one side of the display region and a scan line driver circuit; 7 denotes a group of lines that connects scan lines on a side that lies opposite to the one side of the display region and the scan line driver circuit; 8 denotes a group of lines that connects the signal lines of the display region and the signal line driver circuit; 9 denotes connecting lines that connects the scan line driver circuit and the signal line driver circuit; 10 denotes driver-circuit connecting terminals which are formed on the insulating substrate; 11 denotes a sealing material; 12 denotes connection material; and 13 denotes liquid crystals. Further, in this specification, 'a group of lines' indicates an arbitrary number of lines such as scan lines or signal lines.

As shown in FIGS. 1 and 2, display material such as liquid crystals 13 and the like, for example, is first filled and sealed with sealant 11 between the insulating substrate 1 and the opposing substrate 2, and then driver circuits 4 and 5, which drive a liquid crystal display device, are directly mounted by means of connection material 12 on the insulating substrate 1 in a region excluding the display area and being in the vicinity of an arbitrary side of the display region. In the case of a so-called double-sided input in which scan lines 6 and 7, which are connected from the scan line driver circuit 4 to the display region, for example, are connected to one side of the display region and to another side opposite to the one side, at least a part of the group of scan lines 6, which is connected to one side of the display region, is formed in a region on the insulating substrate in which the signal line driver circuit is mounted so as to detour around the group of signal lines 8 that connects the signal line driver circuit and the signal lines of the display region, and the section of the connection between the group of signal lines 8 and the signal line driver circuit. Further, at least a part of the connecting wiring 9 that connects the scan line driver circuit 4 and the signal line driver circuit 5 is formed in a region on the insulating substrate in which the driver circuits 4 and 5 are mounted.

As a result of the above constitution, in the case of a liquid crystal display device in which a scan line driver circuit and a signal line driver circuit are mounted directly on an insulating substrate close to one side of a display region, the display device can be miniaturized by making the wiring regions excluding the mount regions of the driver circuits extremely small. Further, in the present embodiment, an example is illustrated in which a constitution for the group of scan lines 6 and a constitution for the driver circuit connecting wiring 9 are both applied, but such constitutions may be employed independently. Further, in the present embodiment, a constitution is illustrated in which at least a part of the group of scan lines connected to one side of the display region is formed in a region on the insulating substrate in which the signal line driver circuit is mounted. However, even if at least a part of the group of signal lines 8, which connects the signal line driver circuit and the signal lines of the display region, is formed in a region on the insulating substrate in which the scan line driver circuit is mounted so as to make a detour around the group of scan lines 7 that connects the scan line driver circuit and the scan lines of a side opposite to the one side of the display region, and the section of the connection between the group of scan lines 7 and the scan line driver circuit, the display device can be miniaturized in the same manner as described above.

Second Embodiment

Figure 3:
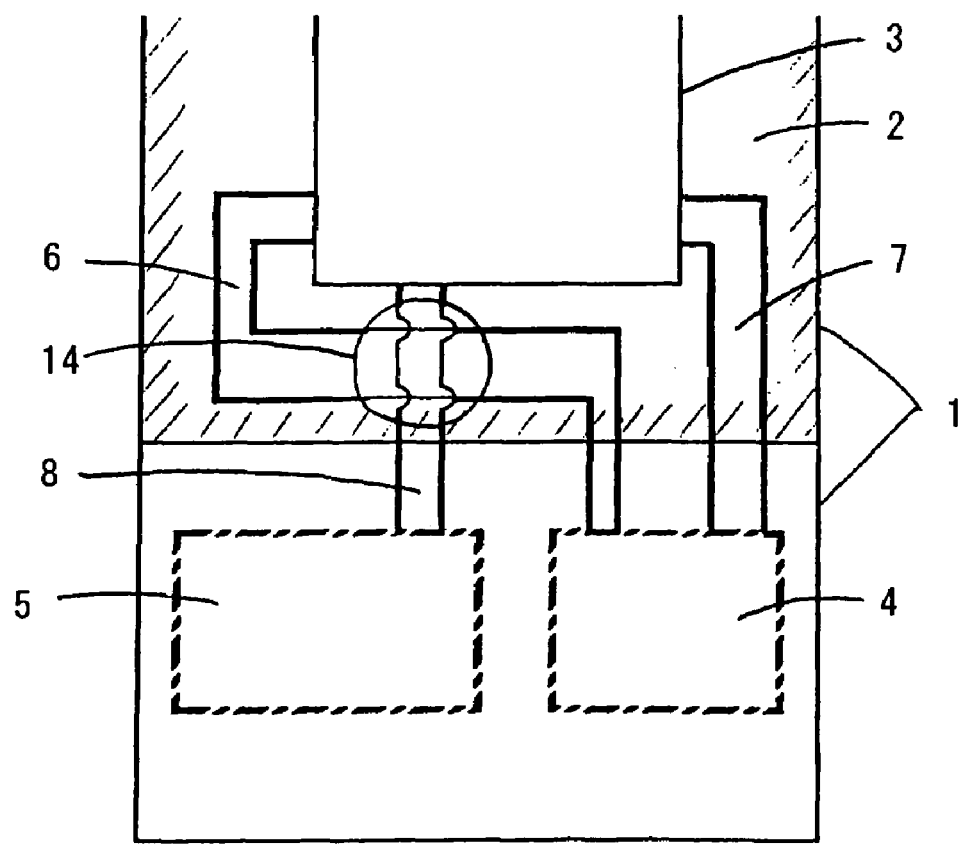
FIG. 3 is a plan view of a liquid crystal display device according to the second embodiment of the present invention.

The second embodiment of the present invention will now be described by referring to FIG. 3. FIG. 3 is a planar view of the liquid crystal display device of the second embodiment of the present invention. In FIG. 3, the same reference numerals is assigned to constituent parts which are the same as those in FIGS. 1 and 2, and a description is therefore provided with respect to the differences. In FIG. 3, 14 denotes crossover points between the group of scan lines 6 and the group of signal lines 8. In the present embodiment, unlike the constitution as in the first embodiment above in which at least a part of the group of scan lines, which is connected to one side of the display region, is formed in a region on the insulating substrate in which the signal line driver circuit is mounted, the group of scan lines 6 and the group of signal lines 8 are formed so as to intersect at the crossover points 14 in a region of overlap between the insulating substrate 1 and the opposing substrate 2. In this case, because the group of scan lines 6 and the group of signal lines 8 are formed so as to intersect via an insulation film or the like, for example, a short circuit between these groups of lines can be prevented.

As a result of such a constitution, similarly to the first embodiment, in the case of a liquid crystal display device in which a scan line driver circuit and a signal line driver circuit are mounted directly on an insulating substrate close to one side of a display region, the display device can be miniaturized. Further, the display device can be miniaturized further by also applying the constitution of the driver circuit connecting wiring 9 according to the first embodiment described above to the present embodiment. Further, in the present embodiment, a constitution is illustrated in which the group of scan lines 6 and the group of signal lines 8 intersect in a region of overlap between the insulating substrate 1 and the opposing substrate 2. However, a constitution is also possible in which the group of scan lines 6 and group of signal lines 8 intersect in a region on the insulating substrate 1 in which there is no overlap with the opposing substrate 2.

Third Embodiment

Figure 4:
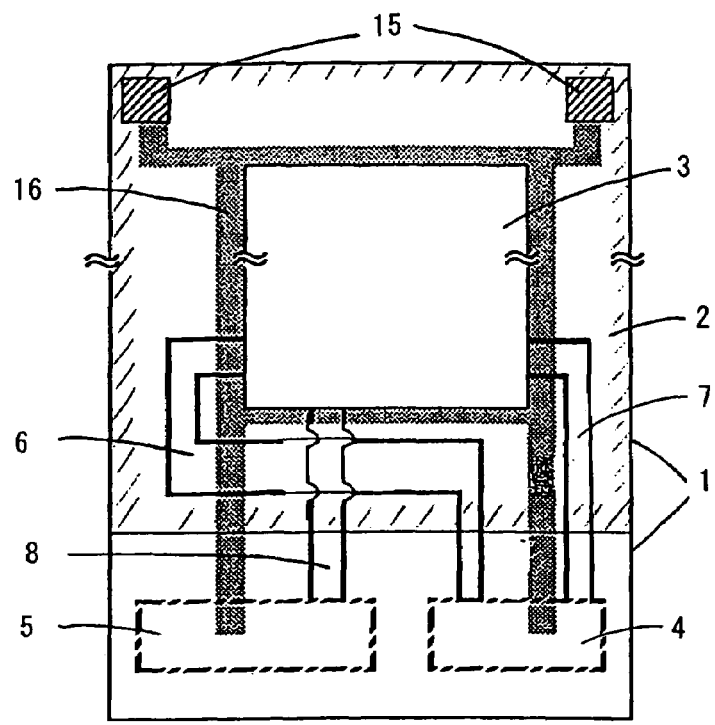
FIG. 4 is a plan view of a liquid crystal display device according to the third embodiment of the present invention.

The third embodiment of the present invention will now be described by means of FIG. 4. FIG. 4 is a planar view of the liquid crystal display device according to the third embodiment of the present invention. In FIG. 4, the same reference numerals are assigned to constituent parts which are the same as those of FIGS. 1 to 3, and therefore a description will be provided with respect to the differences. In FIG. 4, 15 denotes transfer electrodes for supplying an opposite potential (common potential) to the opposing substrate, and 16 is common potential supply wiring for supplying an opposite potential (common potential) to the transfer electrodes 15. As shown in FIG. 4, the present embodiment is such that wiring such as the group of scan lines 6 and 7 and the group of signal lines 8 is not present, and hence the transfer electrodes 15, which supply an opposite potential (common potential) from outside the liquid crystal panels to the opposing substrate via a driver circuit are formed with a relatively high degree of freedom in the vicinity of one side on the insulating substrate opposite to the one side on which the driver circuits are mounted. In cases where this common potential must also be inputted to the display region, the difference in drive capacity, which depends on the distance from the driver circuit, should be minimized, and it is desirable that this common potential supply wiring be formed thickly and be formed on the four sides of the display region so as to surround the display region.

As a result of such a constitution, an enlargement of the display device caused by the formation of the transfer electrodes can be suppressed and the display device can therefore be miniaturized. Further, the display device can be miniaturized further by suitably combining the constitution of the driver circuit connecting wiring of the above first and second embodiments or the constitution of the scan-line or group of signal lines with the present embodiment.

Fourth Embodiment

Figure 5:
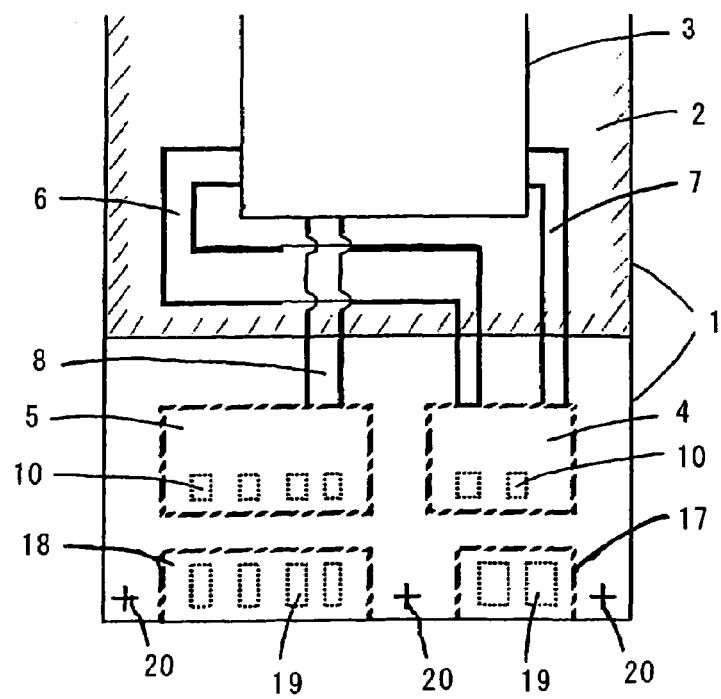
FIG. 5 is a plan view of a liquid crystal display device according to the fourth embodiment of the present invention.
Figure 6:
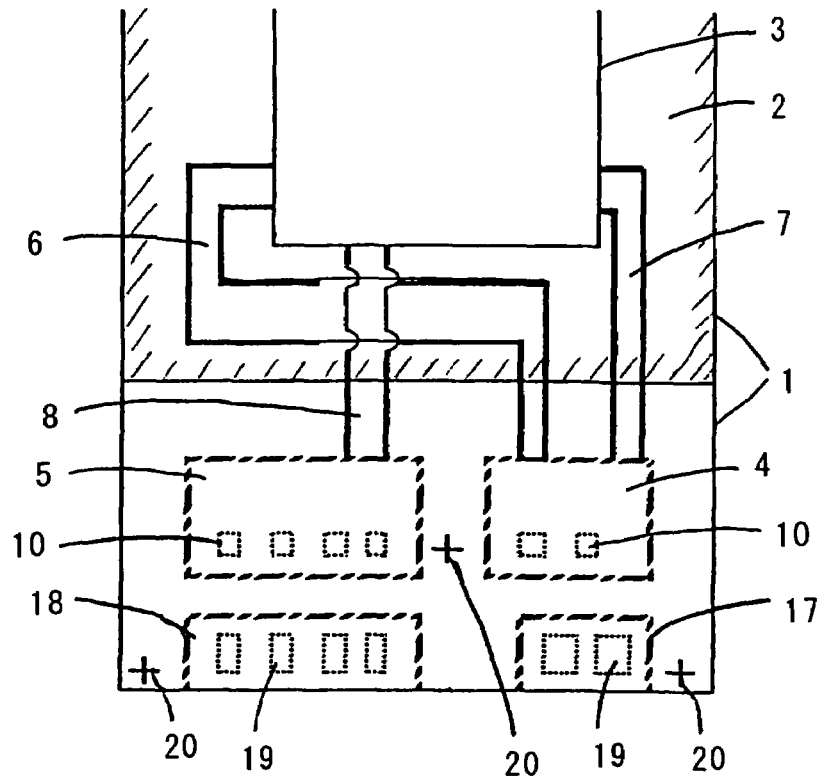
FIG. 6 is another plan view of a liquid crystal display device according to the fourth embodiment of the present invention.

The fourth embodiment of the present invention will be described by means of FIGS. 5 and 6. FIG. 5 is a planar view of the liquid crystal display device according to the fourth embodiment of the present invention, and FIG. 6 is another planar view of the liquid crystal display device according to the fourth embodiment of the present invention. In FIGS. 5 and 6, the same reference numerals are assigned to the constituent elements which are the same as those in FIGS. 1 to 4, and therefore a description will be provided with respect to the differences. In FIGS. 5 and 6, 17 is a flexible substrate (FPC: Flexible Print Circuit) that supplies a scan line potential from outside the liquid crystal panel; 18 is a flexible substrate (FPC) that supplies a signal line potential from outside the liquid crystal panel; 19 are connecting terminals on the insulating substrate for the FPCs 17 and 18; and 20 are mounting overlap marks on the insulating substrate for the mounting of the driver circuits or FPCs.

As shown in FIG. 5, the present embodiment is constituted so as to permit further miniaturization of the display device by mounting the driver circuits 4 and 5 and the FPCs 17 and 18 on an end of the insulating substrate in the vicinity of one side and a common alignment mark 20 are shared for mounting the driver circuits and FPCs. In cases where additional mount precision is sought for the mounting of the driver circuits or FPCs onto the insulating substrate, an alignment mark is desirably also provided in the gap between the driver circuits or FPCs. Due to restrictions posed by mounted devices or the problem of mount precision, some of the alignment marks 20 could also be formed in the gap between the driver circuits which have then been mounted on the insulating substrate, for example, as shown in FIG. 6.

In addition to the above-described alignment marks, any kind of test marks of a display device test process, and so forth, could also be utilized as the marks 20 according to the present embodiment. In addition, the display device can be miniaturized further by suitably combining the constitutions of the driver circuit connecting wiring according to the above first to third embodiments or the constitutions of the scan-line or group of signal lines s, with the present embodiment.

Fifth Embodiment

Figure 7:
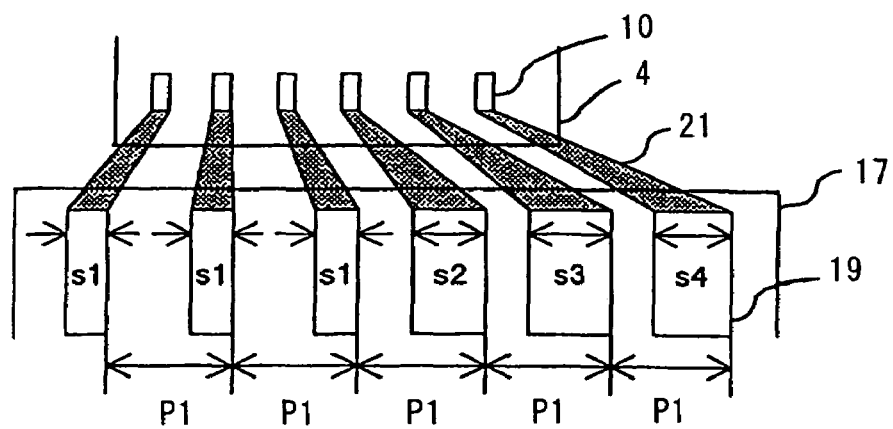
FIG. 7 is a plan view of a liquid crystal display device according to the fifth embodiment of the present invention.
Figure 8:
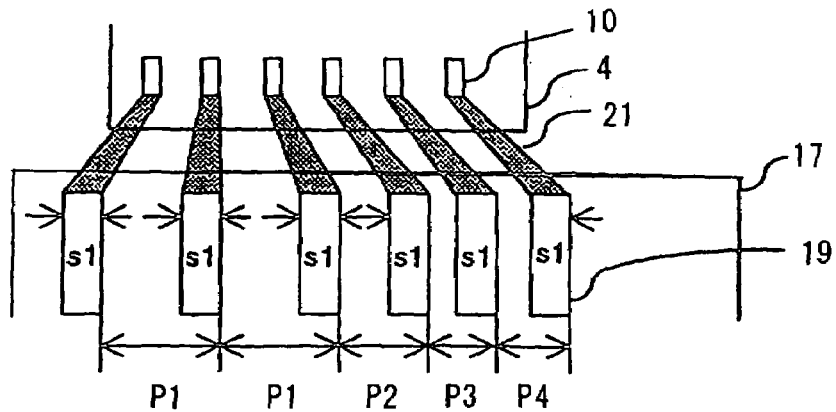
FIG. 8 is another plan view of a liquid crystal display device according to the fifth embodiment of the present invention.
Figure 9:
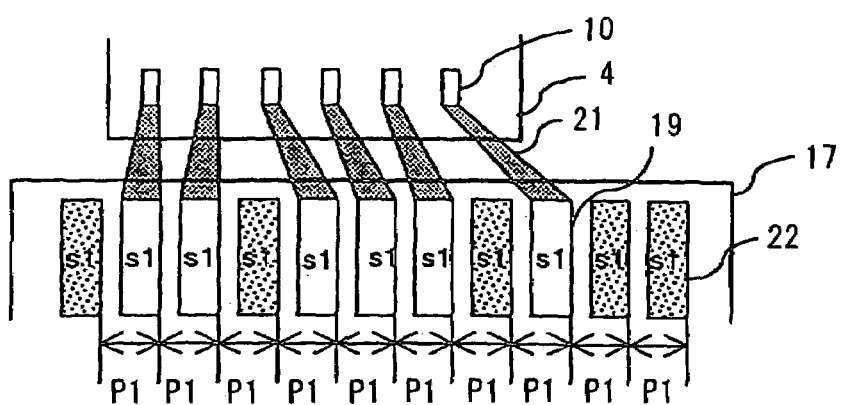
FIG. 9 is another plan view of a liquid crystal display device according to the fifth embodiment of the present invention.

The fifth embodiment of the present invention will now be described by means of FIGS. 7 to 9. FIG. 7 is a planar view of the liquid crystal display device according to the fifth embodiment of the present invention. FIG. 8 is another planar view of the liquid crystal display device according to the fifth embodiment of the present invention. FIG. 9 is another planar view of the liquid crystal display device according to the fifth embodiment of the present invention. In FIGS. 7 to 9, the same reference numerals are assigned to the constituent parts which are the same as those in FIGS. 1 to 6, and a description is therefore provided with respect to the differences. In FIGS. 7 to 9, 21 is connecting lines that connects the connecting terminals of the driver circuits and of the FPCs, while 22 denotes FPC dummy terminals on the insulating substrate.

In FIG. 7, s1 to s4 denote the terminal width of each FPC connecting terminal 19 on the insulating substrate, terminals with the same reference numerals being terminals that have the same width, where p1 denotes the mounting pitch of the terminals. In FIG. 7, the mounting pitch of the FPC connecting terminals 19 on the insulating substrate is p1. In order to reduce the wiring resistance, the terminals connected to long lines are afforded a larger terminal width as well as a larger line width, whereby a lower resistance is achieved. As a result of such a constitution, it is possible to minimize the difference in wiring resistance of the wiring.

In addition, in FIG. 8, s1 denotes the terminal width of the FPC connecting terminals 19 on the insulating substrate, while p1 to p4 denote the mounting pitch of each terminal, terminals with the same reference numerals being terminals that have the same pitch. In FIG. 8, the terminal width of the FPC connecting terminals 19 on the insulating substrate is formed as s1. In order to reduce the wiring resistance, the terminals connected to long lines are afforded a smaller terminal pitch, whereby a lower resistance is achieved. As a result of such a constitution, it is possible to minimize the difference in wiring resistance of the wiring.

Further, in FIG. 9, p1 denotes the mounting width of the FPC connecting terminals 19 on the insulating substrate, while s1 denotes the terminal width. In FIG. 9, by making the terminal width and terminal pitch of the FPC connecting terminals 19 on the insulating substrate the same and forming dummy terminals 22 that are not connected to the scan line driver circuit and the signal line driver circuit on one side or both sides of the terminals with a short wiring length, and the like, it is possible to minimize the difference in wiring resistance of the wiring. Further, by also forming the dummy terminals 22 on the outermost side of the FPC connecting terminals 19, these dummy terminals 19 can also be used as repair terminals for cases where the FPC connecting terminals 19 exhibit problems such as patterning defects or severance, and so forth.

As a result of such a constitution, in a liquid crystal display device in which a scan line driver circuit and a signal line driver circuit are mounted directly onto an insulating substrate in the vicinity of one side of a display region, and in which scan lines for receiving signal inputs from outside and a signal line potential supply FPC are mounted, the difference in wiring resistance of the connecting wiring of the connecting terminals of the driver circuits and the FPCs, which poses a problem in attempts to miniaturize the display device, can be minimized, whereby the display quality of the display device can be improved. Further, the constitution of the present embodiment can be used for either one of: the connecting wiring between the scan line driver circuit and the scan line potential supply FPC, and the connecting wiring between the signal line driver circuit and the signal line potential supply FPC. Further, by combining the constitution of the fourth embodiment above with the present embodiment, the display device can be miniaturized and the display quality can be improved.

Sixth Embodiment

Figure 10:
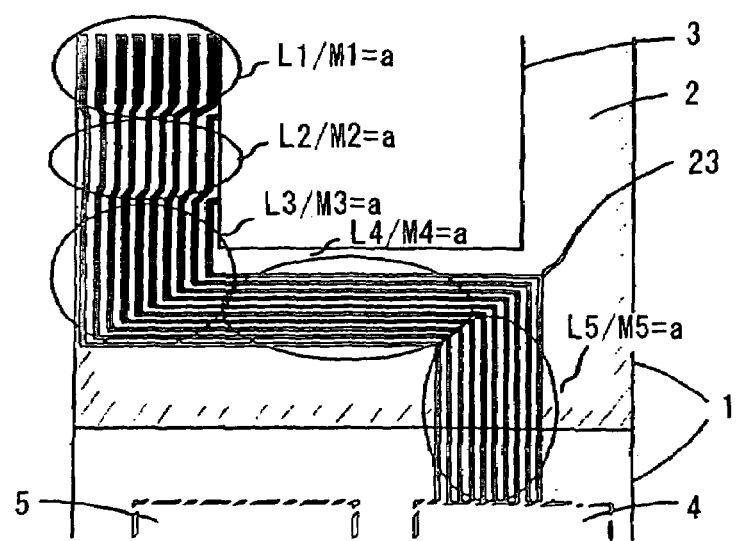
FIG. 10 is a plan view of a liquid crystal display device according to the sixth embodiment of the present invention.
Figure 11:
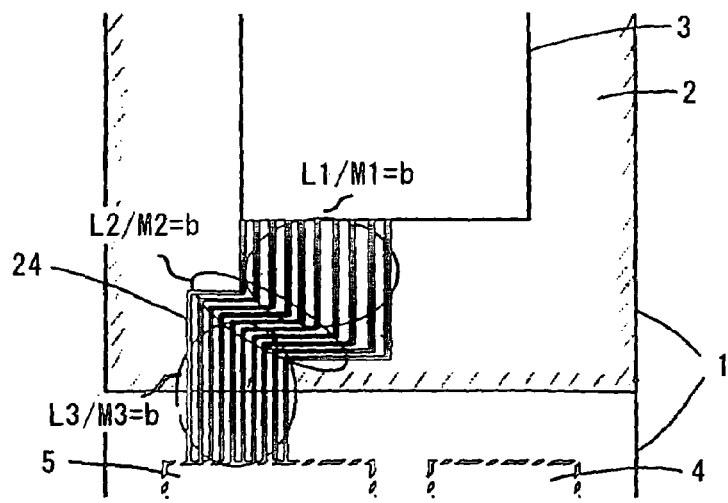
FIG. 11 is another plan view of a liquid crystal display device according to the sixth embodiment of the present invention.

The sixth embodiment of the present invention will now be described by means of FIGS. 10 and 11. FIG. 10 is a planar view of the liquid crystal display device according to the sixth embodiment of the present invention. FIG. 11 is another planar view of the liquid crystal display device according to the sixth embodiment of the present invention. In FIGS. 10 and 11, the same reference numerals have been assigned to constituent parts which are the same as those in FIGS. 1 to 9, and a description is therefore provided with respect to the differences. In FIGS. 10 and 11, 23 denotes wiring that connects the display region and the scan line driver circuit, while 24 denotes wiring that connects the display region and the signal line driver circuit.

In FIG. 10, L1 to L5 denote the line width in the respective regions of the scan lines 23, and M1 to M5 denote the intervals in respective regions of the scan lines 23. In FIG. 10, the scan lines 23 are patterned so that the ratio L/M between the line width and the line interval in the respective regions of the wiring 23 is equal to a predetermined value (L1/M1=L2/M2=L3/M3=L4/M4=L5/M5=a). Further, similarly also in FIG. 11, L1 to L3 denote the line width in respective regions of the signal lines 24, and M1 to M3 denote the intervals in respective regions of the signal lines 24. The signal lines 24 are patterned so that the ratio L/M between the line width and the line interval in the respective regions of the wiring 24 is equal to a predetermined value (L1/M1=L2/M2=L3/M3=b). Further, in the present embodiment, the wiring 23 that connects the display region and the scan line driver circuit in FIG. 10 is connected to only one side of the display region, but, similarly to the embodiment described above, could also be connected to an opposite side.

As a result of such a constitution, in a liquid crystal display device in which a scan line driver circuit and a signal line driver circuit are mounted directly onto an insulating substrate in the vicinity of one side of a display region, problems with disconnection and short-circuit can be prevented by applying a predetermined ratio between the line width and the line interval which serves to lower the rate of occurrence of disconnection defects and short-circuit defects to substantially the entire wiring region. Furthermore, by suitably combining the above first to fifth embodiments with the present embodiment, the display device can be miniaturized and severed line defects and short-circuit defects can also be suppressed, meaning that it is possible to obtain a display device with a high manufacturing yield.

Seventh Embodiment

Figure 12:
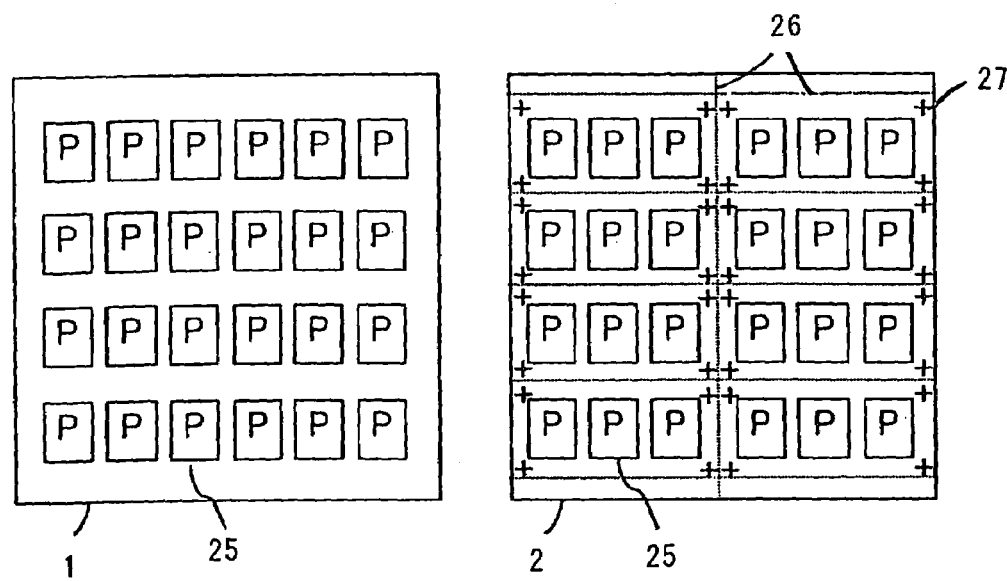
FIG. 12 is an explanatory view of a liquid crystal display device according to the seventh embodiment of the present invention.

The seventh embodiment of the present invention will now be described by means of FIG. 12. FIG. 12 is an explanatory view of the liquid crystal display device according to the seventh embodiment of the present invention. In FIG. 12, the same reference numerals are assigned to the constituent parts which are the same as those in FIGS. 1 to 11, and a description is therefore provided with respect to the differences. In FIG. 12, 25 denotes a liquid crystal panel formation region, 26 denotes cutting lines, and 27 denotes cutting marks.

In FIG. 12, after the insulating substrate 1 and the opposing substrate 2 have been pasted together, cutting marks for cutting off individual liquid crystal panels, or marks for confirming the cutting accuracy, or the like, are formed on the opposing substrate 2. Conventionally, marks 27 have been formed on the insulating substrate 1 because of ease of pattern formation or problems with pattern accuracy; however, it has required some region for the mark formation due to other pattern restrictions, and the like. The formation of the marks 27 on the opposing substrate 2 as per the present embodiment permits miniaturization of the display device and obviates the need for patterning on the insulating substrate, meaning that fabrication can be performed easily without the generation of additional steps (for example, an increase in the short number and an increase in the short size of the photolithographic process, and so forth) in the process of fabricating the insulating substrate.

Further, as a result of suitably combining the constitutions of the above first to sixth embodiments with the present embodiment, not only can the display device be further miniaturized, an increase in the display quality and the manufacturing yield, and so forth, is also permitted.

A description has been provided hereinabove in the above first to seventh embodiments for a liquid crystal display device that comprises driver circuits for driving the liquid crystal display device or FPCs for receiving signal inputs from outside. However, the present invention is not limited to or by such a liquid crystal display device, and it is obvious that no impediment is caused even if the present invention is applied to a display device that uses electroluminescent elements and so forth or indeed to every kind of display device that comprises driver circuits or FPCs for receiving signal inputs from outside.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display device comprising:
scan lines on a insulating substrate;
signal lines on the insulating substrate;
a display area comprising pixel electrodes connected to the signal lines;
a scan line driver circuit connected to the scan lines;
a signal line driver circuit connected to the signal lines;
a flexible substrate providing at least one of a scan potential to the scan line driver circuit and a signal potential to the signal line driver circuit from outside,
wherein the scan line driver circuit and the signal line driver circuit are mounted directly on the insulating substrate in a region outside of the display area closely opposed to a same side of the display area, with the signal lines intersecting with and spaced from the scan lines by an insulating film in the region outside of the display area, and
terminals on the insulating substrate for connecting the flexible substrate are connected to the scan line driver circuit or the signal line driver circuit by connecting lines having different lengths, with longer connecting lines being formed wider than connecting lines that are shorter than the longer connecting lines, and the terminals connected to the longer connecting line are also formed wider than terminals connected to the connecting lines that are shorter than the longer connecting lines.

2. A display device comprising:
a display area comprising a plurality of pixels;
scan lines on a insulating substrate;
signal lines on the insulating substrate;
pixel electrodes connected to the signal lines;
a scan line driver circuit connected to the scan lines;
a signal line driver circuit connected to the signal lines;
a flexible substrate providing at least one of a potential scan to the scan line driver circuit and a potential signal to the signal line driver circuit from outside,
wherein the scan line driver circuit and the signal line driver circuit are mounted directly on the insulating substrate in a region outside of the display area closely opposed to a same side of the display area, with the signal lines intersecting with and spaced from the scan lines by an insulating film in the region outside of the display area,
connecting terminals on the insulating substrate for connecting the flexible substrate are connected to the scan line driver circuit or the signal line driver circuit by connecting lines of different length, and
dummy terminals on the insulating substrate that are not connected to the scan line driver circuit or the signal line driver circuit, at least some of the dummy terminals being formed between at least some of the connecting terminals connected to one of the scan line driver circuit or the signal line driver circuit and at least some other dummy terminals being formed at an outermost side of the connecting terminals connected to the one of the scan line driver circuit or the signal line driver circuit on the flexible substrate, the dummy terminals being all of a same width.

* * * * *